United States Patent
Jiang et al.

(10) Patent No.: US 8,719,226 B1
(45) Date of Patent: May 6, 2014

(54) DATABASE VERSION CONTROL

(75) Inventors: Tong Jiang, Fremont, CA (US); Jianguo Hu, Santa Clara, CA (US); Jian Jin, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 433 days.

(21) Appl. No.: 12/504,526

(22) Filed: Jul. 16, 2009

(51) Int. Cl.
*G06F 17/00* (2006.01)

(52) U.S. Cl.
USPC ........... 707/638; 707/639; 707/649; 707/695; 707/806

(58) Field of Classification Search
USPC ........... 707/638, 639, 649, 695, 806, 999.203
See application file for complete search history.

(56) References Cited

U.S. PATENT DOCUMENTS

| | | | |
|---|---|---|---|
| 5,280,612 A | | 1/1994 | Lorie et al. |
| 6,460,052 B1 | | 10/2002 | Thomas et al. |
| 6,484,186 B1 | * | 11/2002 | Rungta ................................ 1/1 |
| 6,631,381 B1 | | 10/2003 | Couch et al. |
| 2003/0046260 A1 | * | 3/2003 | Satyanarayanan et al. ....... 707/1 |
| 2003/0182322 A1 | * | 9/2003 | Manley et al. ................. 707/201 |
| 2004/0230895 A1 | * | 11/2004 | Elza et al. ...................... 715/511 |
| 2005/0027757 A1 | * | 2/2005 | Kiessig et al. ................. 707/204 |
| 2006/0224626 A1 | * | 10/2006 | Lakshminath et al. .... 707/104.1 |
| 2007/0027938 A1 | * | 2/2007 | Clarke ........................... 707/204 |
| 2007/0130229 A1 | * | 6/2007 | Anglin et al. ................. 707/204 |
| 2007/0220065 A1 | * | 9/2007 | Coyle et al. ................... 707/203 |
| 2007/0226730 A1 | * | 9/2007 | Coyle et al. ................... 717/170 |
| 2007/0244918 A1 | * | 10/2007 | Lee et al. ....................... 707/102 |
| 2008/0005509 A1 | * | 1/2008 | Smith et al. .................... 711/162 |
| 2008/0021883 A1 | * | 1/2008 | Alstrin et al. ...................... 707/3 |
| 2008/0046476 A1 | * | 2/2008 | Anderson et al. ............. 707/200 |
| 2008/0059541 A1 | * | 3/2008 | Fachan et al. ................. 707/204 |
| 2008/0256399 A1 | * | 10/2008 | Erdosi et al. ..................... 714/47 |
| 2009/0089268 A1 | * | 4/2009 | Benedikt et al. .................. 707/4 |
| 2009/0193054 A1 | * | 7/2009 | Karimisetty et al. ...... 707/103 Y |
| 2010/0191774 A1 | * | 7/2010 | Mason et al. .................. 707/797 |

OTHER PUBLICATIONS

Chien et al., "A comparative Study of Version Management Schemes for XML Documents", Sep. 2000, TimeCenterTechnical Report, pp. 1-17.*

* cited by examiner

*Primary Examiner* — Ajay Bhatia
*Assistant Examiner* — Randall Burns
(74) *Attorney, Agent, or Firm* — Harrity & Harrity, LLP

(57) ABSTRACT

A database enables versioning for objects stored in the database via a "snapshot" operation. In one implementation, a device performs a snapshot operation in which a snapshot object, representing a logical view of database objects at a time at which the snapshot operation is performed, is created and stored in the database. In response to a request to store a modified version of a database object, the modified version of the database object is written to replace the previous version of the database object when the database object was last modified after the most recent snapshot operation. Further, in response to the request to store the modified version of the database object, the modified version of the database object is inserted in the database when the previous version of the database object was last modified before the most recent snapshot operation.

22 Claims, 7 Drawing Sheets

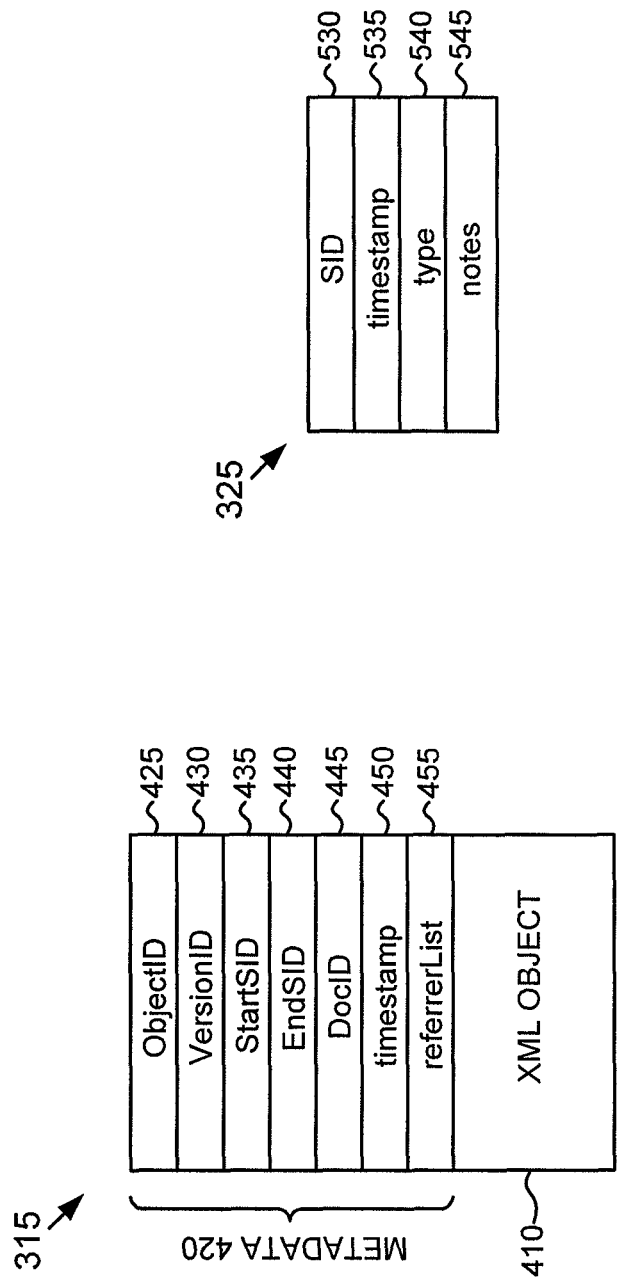

DATABASE VERSION CONTROL

BACKGROUND

A database can be defined as an integrated collection of logically related objects that are stored in a computer system. In an XML (extensible markup language) database, objects stored in the database are represented as XML documents. Data in the XML documents may be queried, exported and serialized into a desired format.

Existing XML database products may store only a single version of each object. Later versions of the object that are stored to the database may overwrite the current version. In other words, the database may keep only the most recent version of the object. In some applications, object history is valuable and it may be desirable to have multiple versions of objects stored in a database so that users can query older versions of objects.

SUMMARY

According to one implementation, a method for may provided versioning control for application objects stored in a database. The method being performed by one or more computing devices and comprise: performing a snapshot operation in which a snapshot object, representing a logical view of the application objects at a time at which the snapshot operation is performed, is created and stored in the database. The method may further include storing the plurality of application objects in the database, each of the application objects being associated with state information including at least a version of the application object and a range of snapshot objects that apply to the application object. The method may further include receiving a request to store a modified version of one of the application objects in the database and replacing the one of the application objects with the modified version in the database when the one of the application objects was last modified in the database after a most recent of the snapshot operations. Further, the method may include inserting the modified version of the application object as a new application object in the database when the one of the application objects was last modified in the database before the most recent of the snapshot operations.

According to another implementation, a device may comprise a processor; a database; and a computer-readable medium containing instructions, that when executed by the processor, cause the processor to control the database to store a plurality of application objects. The application objects are stored by performing a snapshot operation in which a snapshot object, representing a logical view of the application objects at a time at which the snapshot operation is performed, is created and stored in the database; associate each of the application objects with state information including at least a version of the application object and a range of snapshot objects that apply to the application object; replacing, in response to a request to store a modified version of one of the application objects in the database and when the one of the application objects was last modified in the database after a most recent of the snapshot operations, the one of the application objects with the modified version in the database; and inserting, in response to the request to store a modified version of one of the application objects in the database and when the one of the application objects was last modified in the database before the most recent of the snapshot operations, the modified version of the application object as a new application object in the database.

In another implementation, a method may include performing, by the one or more computing devices, a snapshot operation of a database in which a snapshot object, representing a logical view of objects in the database at a time at which the snapshot operation is performed, is created and stored in the database; receiving, by the one or more computing devices, a request to store a modified version of one of the objects in the database; replacing, by the one or more computing devices and in response to the received request, the one of the objects with the modified version in the database when the one of the objects was last modified in the database after a most recent of the snapshot operations; and inserting, by the one or more computing devices and in response to the received request, the modified version of the object as a new object in the database when the one of the objects was last modified in the database before the most recent of the snapshot operations. In the method, each of the snapshot objects may be associated with a snapshot number and each of the objects in the database is associated with a range of snapshot numbers to which the object is associated.

In yet another implementation, a device may comprise means for performing a snapshot operation of a database in which a snapshot object, representing a logical view of objects in the database at a time at which the snapshot operation is performed, is created and stored in the database; means for receiving a request to store a modified version of one of the objects in the database; means for replacing the one of the objects with the modified version in the database when the one of the objects was last modified in the database after a most recent of the snapshot operations; and means for inserting the modified version of the object as a new object in the database when the one of the objects was last modified in the database before the most recent of the snapshot operations. Further, each of the snapshot objects may be associated with a snapshot number and each of the objects in the database is associated with a range of snapshot numbers to which the object is associated.

BRIEF DESCRIPTION OF THE DRAWINGS

The accompanying drawings, which are incorporated in and constitute a part of this specification, illustrate one or more implementations of the invention and, together with the description, explain these implementations. In the drawings:

FIG. 4 is a diagram illustrating an exemplary object of the database shown in FIG. 3;

FIG. 5 is a diagram illustrating exemplary possible attributes for a snapshot object of the database shown in FIG. 3;

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and equivalents.

An XML database is described herein that enables versioning for objects stored in the database. A "snapshot" operation is particularly defined for the database, in which each snapshot stores a copy of the database at the time of the snapshot. Users can effectively query old versions of objects or rollback the entire database to a particular older snapshot.

In one particular implementation, the database may be implemented in a network management device and the objects stored in the database may include XML objects relating to security policy and configuration of network devices controlled by the network management device.

Exemplary Environment

Figure 1:
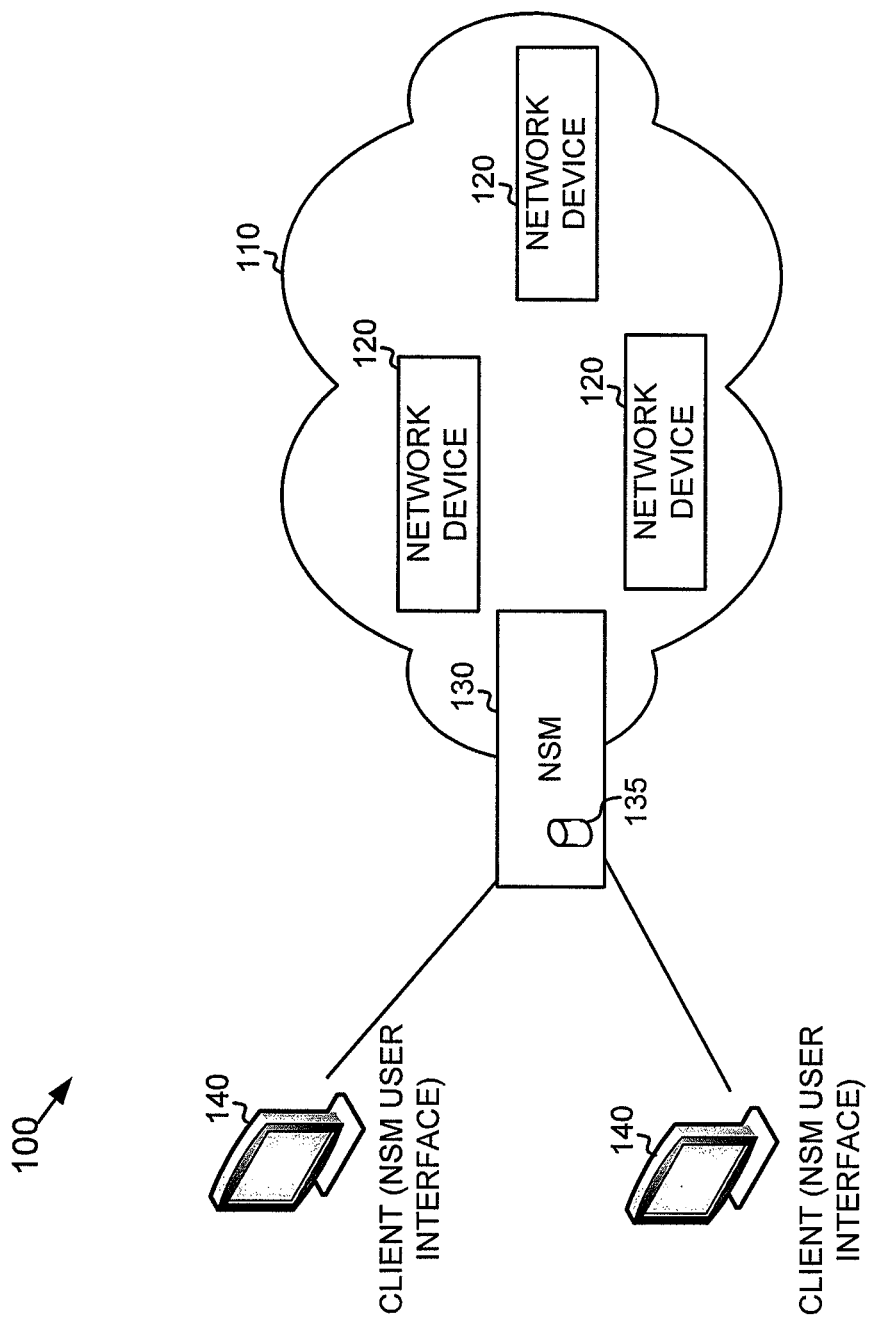
FIG. 1 is a diagram of an exemplary environment in which systems and/or methods described herein may be implemented.

FIG. 1 is a diagram of an exemplary environment 100 in which systems and/or methods, described herein, may be implemented. Environment 100 may include a network 110, which may be, for example, a local area network (LAN), a wide area network (WAN) such as the Internet, or a combination of these networks or other types of networks. In one particular implementation, network 110 may be a proprietary corporate network. Network 110 may connect to a number of clients 130.

Network 110 may include or be implemented by a number of network devices 120, which each may perform functions relating to the operation of network 110. Network devices 120 may include, for example, routers, switches, gateways, firewalls, virtual private network (VPN) devices, or other network devices.

Network 110 may also include a network device, labeled as Network and Security Manager (NSM) device 130. NSM 130 may operate as a centralized device through which users, such as network administrators, may control network devices 120. NSM 130 may provide an interface, such as a graphical interface provided via hypertext transfer protocol (HTTP) connections, to clients 140. Through NSM 130, clients 130 may configure the operation of network devices 120, such as by configuring security policies, setting operating parameters, or performing software upgrades.

NSM 130 may include a database 135. Database 135 may be an XML database that stores XML documents (objects) relating to the configuration of network devices 120. An object may, for example, specify the configuration parameters for one of network devices 120.

Clients 140 may each include client devices, such as a personal computer or other computing device, through which administrators may interact with NSM 130 to configure network devices 120. Clients 140 may include, for example, a specialized application designed to interact with NSM 130 or a general application, such as a web browser, through which clients 140 may connect to NSM 130. Although clients 140 are shown in FIG. 1 as "NSM user interface" devices, in other exemplary implementations, clients 140 may be general purpose computers that may, when directed by an administrator, present an interface that allows users to configure NSM 130.

Exemplary NSM

Figure 2:
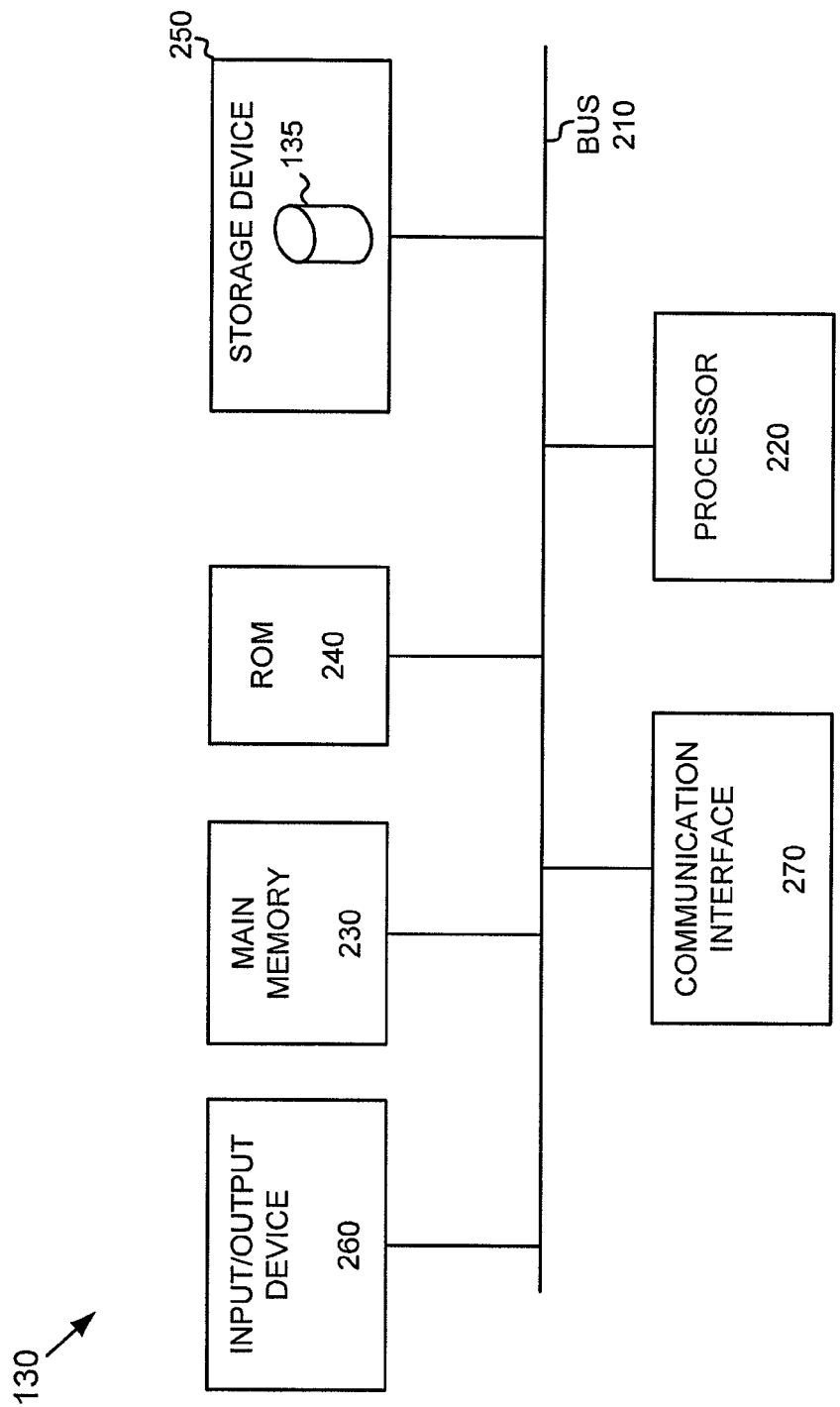
FIG. 2 is a block diagram of exemplary components of a computing device shown in FIG. 1.

FIG. 2 is a block diagram of exemplary components of a computing device shown in FIG. 1, such as NSM 130. As shown in FIG. 2, NSM 130 may include a bus 210, a processor 220, a main memory 230, a read only memory (ROM) 240, a storage device 250, an input/output device 260, and a communication interface 270. While FIG. 2 shows particular components of NSM 130, NSM 130 may include different and/or differently arranged components in other implementations.

Bus 210 may include a path that permits communication among the components of NSM 130. Processor 220 may include a processor, a microprocessor, an application specific integrated circuit (ASIC), a field programmable gate array (FPGA), or another type of processor that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic storage medium, such as a hard disk drive, or a removable memory, such as a flash memory.

Input/output device 260 may include a mechanism that permits an operator to input information to NSM 130, such as a control button, and/or a mechanism that outputs information to the operator, such as a light emitting diode or some form of display. Communication interface 270 may include any transceiver-like mechanism that enables NSM 130 to communicate with other devices and/or systems. In one implementation, communication interface 270 may include one or more ports, such as Ethernet ports, via which data may be received and/or transmitted.

Storage device 250 may particularly store data for database 135. Database 135 may be, for example, a relational database. In one implementation, database 135 may be an XML database. An XML database may include a database designed to store data in XML format, and may allow the stored XML data to be queried, exported, and/or serialized into a desired format. Although database 135 is shown within storage device 250, in other exemplary implementations, database 135 may be stored in, for example, main memory 230, ROM 240, or a combination of main memory 230, ROM 240, and storage device 250. Further, the term "database," as used herein, may be interchangeably used to refer to either the data that is stored in the database or the software instructions used to implement access to the data that is part of the database.

NSM 130 may perform certain operations, as described in detail below. NSM 130 may perform these operations in response to processor 220 executing software instructions contained in a computer-readable medium, such as main memory 230. A computer-readable medium may be defined as a physical or logical memory device. A logical memory device may include memory space within a single physical memory device or spread across multiple physical memory devices.

The software instructions may be read into main memory 230 from another computer-readable medium, such as data storage device 250, or from another device via communication interface 270. The software instructions contained in main memory 230 may cause processor 220 to perform processes relating to the access and management of database 135, and will be described below. Alternatively, hardwired circuitry may be used in place of or in combination with software instructions to implement processes described herein. Thus, implementations described herein are not limited to any specific combination of hardware circuitry and software.

Exemplary Database

Figure 3:
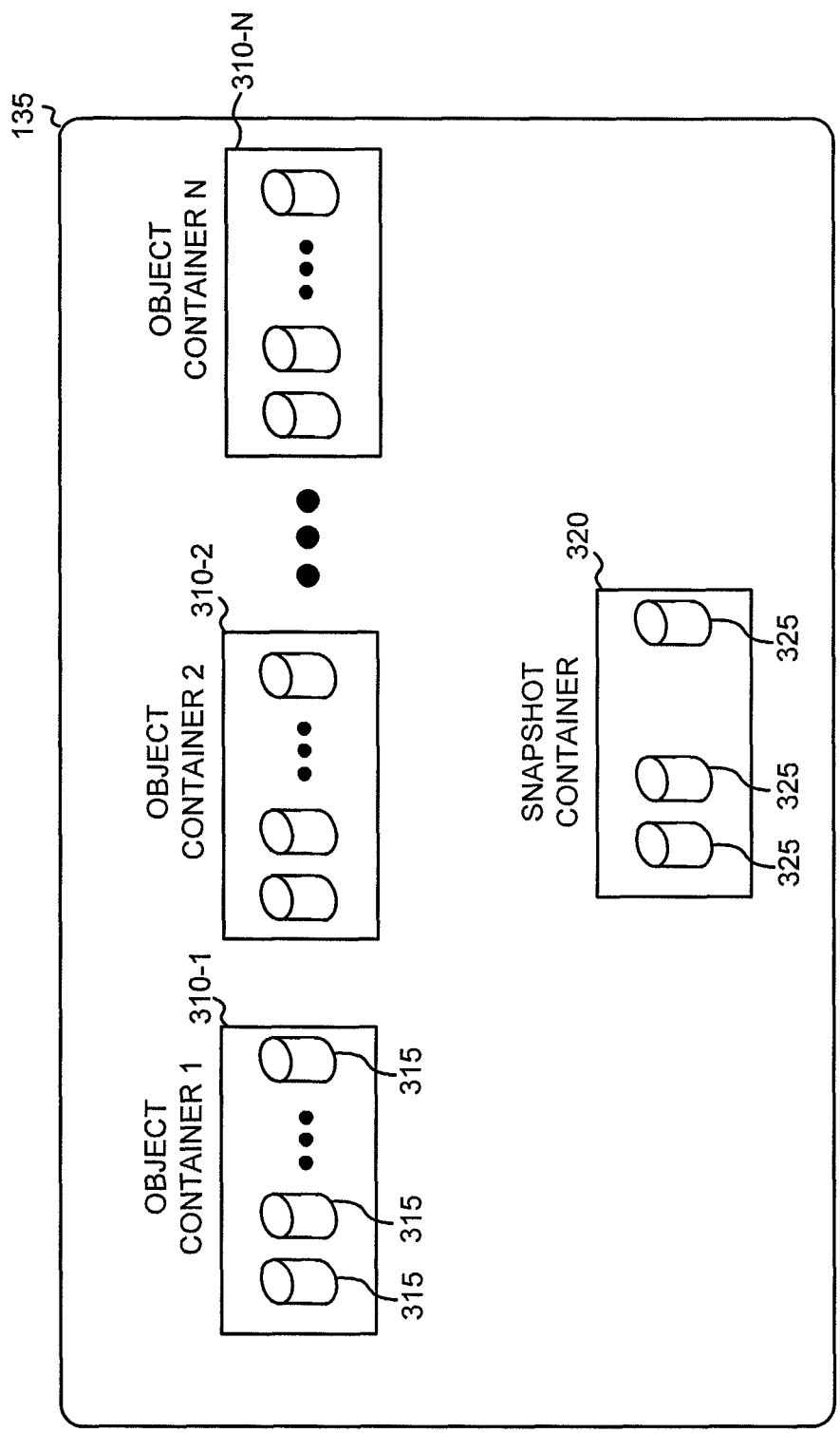
FIG. 3 is a diagram conceptually illustrating an organization of a database.

FIG. 3 is a diagram conceptually illustrating an organization of database 135. Database 135 may contain a number of XML objects. Database 135 may particularly contain a number of object containers 310-1 through 310-N and a snapshot container 320. Each container 310 may store one or more objects 315 ("application object")) that are used as part of the application using database 135, such as a network device manager implemented by NSM 130. Snapshot container 320 may store snapshot objects 325 that are used to provide versioning (i.e., the ability to store and allow retrieval of different versions of objects) for database 135.

In an implementation in which database 135 is used by NSM 130 to manage network devices 120, objects 315 in each container 310 may be objects of a particular type relating to the configuration, setup, or administration of network devices 120, such as objects relating to security policies for firewalls or objects relating to configuration of network devices 120.

Snapshot container 320 may store XML objects used to store the state of database 135 at a particular "snapshot" instance in time. The state of database 135 may include all of object containers 310 in database 135, the versions of objects 315 at the snapshot time, and the relations between objects 315. Snapshot container 320 may contain a number of snapshot objects 325. Each snapshot object 325 may correspond to a snapshot of database 135 at a particular point in time.

Although objects 315 and 325 are shown in FIG. 3 as being logically included in containers 310 and 320, the concept of a container may not be necessary in some implementations. Instead, database 135 may simply store a number of objects, such as XML objects.

As previously mentioned, database 135 may include a versioning control system in which snapshots of database 135 may be taken. In contrast to existing database solutions, in which a snapshot may refer to an operation that creates a copy of the database, a snapshot consistent with aspects described herein may take relatively little additional storage space and may execute relatively quickly.

Although concepts described herein are described as being performed by database 135, the functionality need to implement the concepts described herein may be implemented in either the "core" logic of database 135 or as an add-on component to an existing database solution.

FIG. 4 is a diagram illustrating an exemplary object 315 of database 135. Each object 315 may be associated with two kinds of information: an XML document itself (i.e., an XML object 410) and metadata 420.

Metadata 420 may include a number of fields used to store state information relating to the object and the snapshot(s) in which the object is included. The fields may include an ObjectID field 425, a VersionID field 430, a StartSID field 435, an EndSID field 440, a DocID field 445, a timestamp field 450, and a referrerList field 455. ObjectID field 425 may include a value that uniquely identifies each object of a given type. This field may be implemented as, for example, a 32-bit integer. VersionID field 430 may store a value identifying the version of the object. During the object's lifecycle, the object may be modified and saved a number of times. Each modification of the object may be associated with a different object version, which may be noted in VersionID field 430. This field may be implemented as, for example, a 16-bit integer.

StartSID (start snapshot ID) field 435 and EndSID (end snapshot ID) field 440 may be used to identify a range of snapshots associated with the object. StartSID field 435 may store a value identifying the first snapshot created after the object's last update and EndSID field 440 may store a value identifying the last (most recent) snapshot created after the object's last update. When modifying an object, StartSID field 435 and EndSID field 440 may be used to determine whether a new copy of an object should be made when saving the modified object. More particularly, when modifying an object, database 135 may determine if there are any snapshots created after the object's last update. If yes, the object may be saved as a new object version. The use of StartSID field 435 and EndSID field 440 in implementing database versioning will be described in more detail below.

DocID field 445 may be a value used to uniquely identify an object in conjunction with its version. DocID field 445 may, for instance, include a concatenation of ObjectID field 425 and VersionID field 430. In some implementations, additional information may also be included in DocID field 445. For example, in an application using network devices 120, different network devices may be assigned to different network domains. In this case, DocID field 445 may also incorporate a value identifying the domain of the network device.

Timestamp field 450 may store a value indicating the date and time of the last update of the object.

Objects stored in database 135 may include a referential relationship between the objects. For example, when the objects in database 135 are used to implement security policies for network devices 120, a policy may be constructed based on a number of rules applied in a certain order. Each rule may be represented by an object. Further, different policies may use the same rule (object). ReferrerList field 455 may be a structure that stores a list of other objects that depend on the object.

FIG. 5 is a diagram illustrating exemplary attributes for snapshot object 325. As shown, snapshot object 325 may include a snapshot identifier (SID) field 530, a timestamp field 535, a type field 540, and a notes field 545.

Snapshot identifier (SID) field 530 may include an identifier for the snapshot. SID field 530 may be an integer that is incremented for each successive snapshot. For example, the first snapshot may have a SID of one, the second snapshot a SID of two, etc. Timestamp field 535 may store a date and time at which the snapshot was performed. Type field 540 may include a value corresponding to a user-defined snapshot type. For instance, in some applications, it may be desirable to perform separate snapshots for separate object types, such as a device update snapshot that only stores versioning information for "device update" objects and a policy update snapshot that only stores versioning information for "policy" objects. Notes field 545 may include user added textual notes about a snapshot.

Snapshot object 325 may be created by database 135 in response to a number of possible manual or automatic triggers, such as triggers based on high-level user actions (e.g., updating a device, changing the security policy of the device, a manual request to initiate a snapshot, etc.). Each snapshot object may define a logical view of the objects in the database at a particular point in time.

Figure 6:
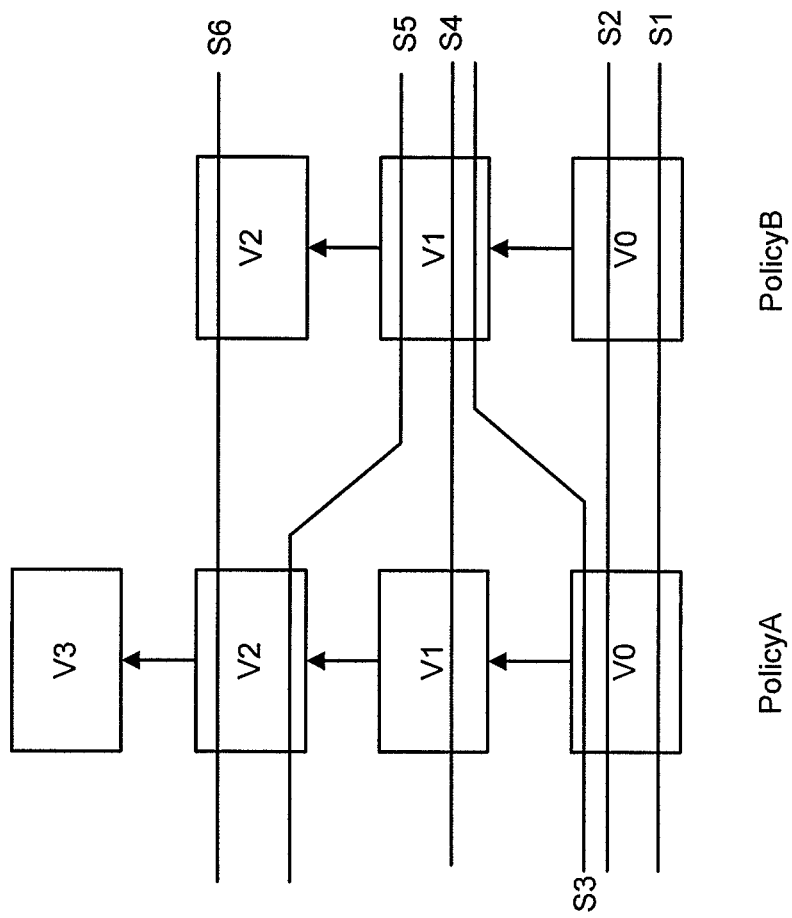
FIG. 6 is a diagram conceptually illustrating a relationship of a number of successive snapshots to objects.

FIG. 6 is a diagram conceptually illustrating the relationship of a number of successive snapshots to objects 315. Two objects are shown in this example, an object labeled "PolicyA" and an object labeled "PolicyB." Assume that four versions of policyA have been saved over time, labeled as version 0 (V0) through version 3 (V3). Further, assume that three versions of policyB have been saved over time, labeled as version 0 (V0) through version 2 (v2).

The first and second snapshots taken of the database (snapshots S1 and S2) includes version V0 of both objects. After this point, assume that policyB is modified so that the most recent version of this policy is V1. At this point, the next snapshot (snapshot S3) is taken. Snapshot S3 may include V0 of policyA and V1 of policyB. Assume policy A is now modified, resulting in the latest version of policyA being V1. At this point, the next snapshot (snapshot S4) is taken. Snapshot S4 may include V1 of policyA and V1 of policyB. This process may continue with snapshots S5 and S6, each capturing the current version of the policyA and policyB objects. Finally, assume V3 of policyA is created. In the diagram of FIG. 6, a snapshot has not been taken that includes V3 of policyA. From the example of FIG. 6, it can be seen that the relationship between an object's version and a snapshot is a one-to-many relationship. A particular version of an object may belong to multiple snapshots but each snapshot may contain at most one version of each object.

Figure 7:
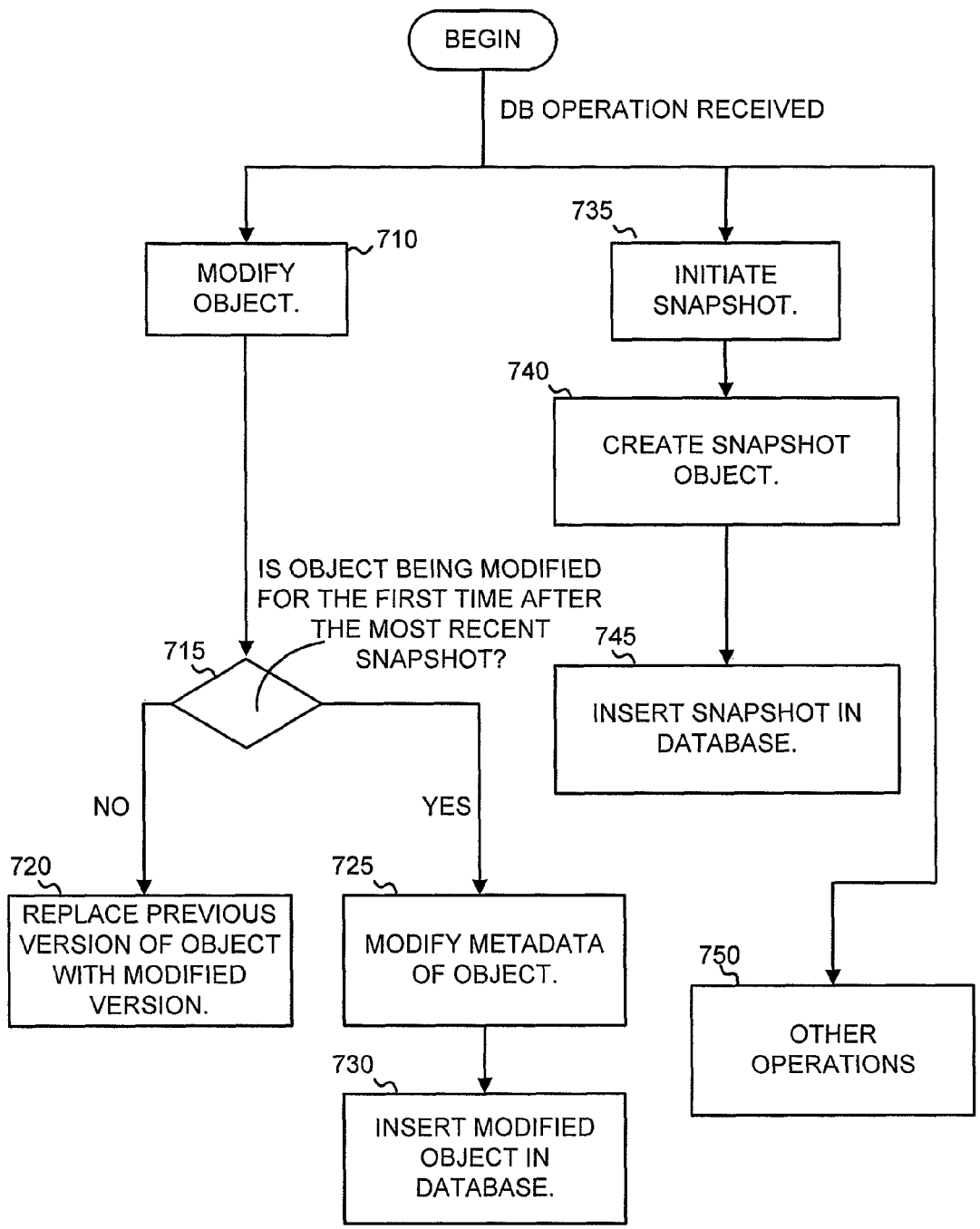
FIG. 7 is a flowchart illustrating exemplary operations, relating to database snapshots, that may be performed by a database.

FIG. 7 is a flowchart illustrating exemplary operations, relating to database snapshots, that may be performed by database 135. In general, database 135 may support a number of options relating to snapshot versioning. A number of these options are shown in FIG. 7.

Database 135 may receive an operation directing database 135 to save a modified version of an object (block 710). An object may be modified by, for example, an administrator that changes the object, such as an object that contains a policy rule for a network device that is modified at NSM 130 in response to the administrator changing a policy at the network device.

Database 135 may determine whether the object is being modified for the first time after the most recently taken snapshot (block 715). Block 715 may be performed by comparing timestamp 450 for the object to timestamp 535 of the most recent snapshot. If no, i.e., the object was previously modified after the most recent snapshot, the new version of the object may be saved to overwrite the previous version of the object (block 720). Timestamp 450 may be updated to reflect the date and time of the latest object modification. Advantageously, when replacing an object with a new version of the object in block 720, there is no additional overhead associated with database snapshot versioning.

If the result of block 715 is true (yes), i.e., a snapshot was performed after the last save to the object, the new version of the object may be saved as a new copy of the object (blocks 725 and 730). More particularly, DocID field 445, VersionID field 430, and EndSID field 440 of metadata 420 of the previous version of the object may be modified for the object (block 725). DocID field 445 may be modified to include the new identifier for the object. VersionID field 430 may also be modified to reflect the next version for the object. For example, in a simple versioning system in which subsequent versions of objects are given increasing version numbers, VersionID field 430 may be incremented by one. EndSID field 440 may be set to the number of current snapshots plus one. The modified object, along with its modified metadata, may then be inserted into database 135 (block 730). At this point, both the previous version of the object and the current version may exist in the database as separate objects.

Figure 8:
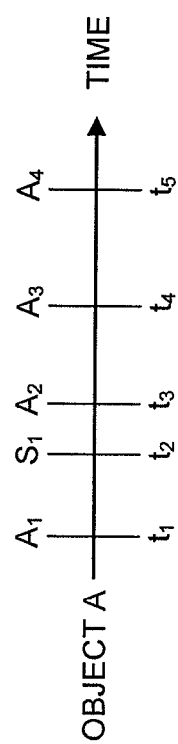
FIG. 8 is a timing diagram illustrating modification of an object.

FIG. 8 is a timing diagram illustrating modification of an object, as performed in blocks 715 through 730. In FIG. 8, "$A_n$," represents different versions of object "A" (i.e., versions 1, 2, 3, 4), "$S_1$" represents a first snapshot, and "$t_n$" represents different instances in time. At time t1, A1 is added to database 135, at time t2, a snapshot is taken, and at times t3 and t4, different versions of A are written to database 135. Version $A_2$, because it is the first version saved after the snapshot, has its metadata modified and is inserted into database 135 as a new object (FIG. 7; blocks 725 and 730). Versions $A_3$ and $A_4$, however, because there is no snapshot taken between the saving of version $A_2$ and these versions, can be saved to database 135 by overwriting the previous version (FIG. 7; block 720). After saving $A_4$ at $t_5$, database 135 may include $A_1$ and $A_4$, and a single snapshot that captures the state of database 135 at time $t_1$.

Referring back to FIG. 7, database 135 may, at various times, initiate generation of a snapshot of the current state of objects in the database (block 735). The snapshot operation may be performed in response to a request directing database 135 to initiate a new snapshot, such as a request generated manually by an administrator or automatically. For example, NSM 130 may be configured to automatically initiate a snapshot in response to changes to network device configuration information or policy information.

A snapshot object may be created in response to initiation of a snapshot (block 740). The snapshot object may contain the attributes shown in FIG. 5. SID field 530 may include a numeric value equal to the number of shapshots made for database 135. Timestamp field 535 may include date and time of the snapshot. In situations in which snapshots are being used to only apply to certain types of objects, type field 545 may include the type(s) of objects for which the snapshot is being used.

The snapshot object may be inserted into database 135 in snapshot container 320 (block 745). As can be seen from the operations shown in blocks 740 and 745, the creation of a snapshot object may be a relatively efficient operation requiring little transactional overhead in database 135.

In addition to modifying an object and initiating a snapshot, a number of other operations may be performed by database 135 (block 750). These operations may include, for example: (1) adding a new object, (2) deleting an object, (3) deleting a snapshot, and (4) retrieving objects in a snapshot.

To add a new object 315 to a container 310, metadata 420 for the object may be set so that StartSID field 435 is set the value of the next snapshot ID value. EndSID field 440 may be set to a reserved value, such as a maximum value of EndSID field 440 (e.g., hexadecimal value FFFFFFFF), which may be used to indicate the maximum (i.e., most recent) snapshot number. Timestamp 450 may be set based on the current date and time. ObjectID field 425, VersionID field 430, DocID field 445, and referrerList field 455 may be set based on the particular object and initial version of the object. Database 135 may experience little performance overhead due to the addition of an object while supporting snapshots.

An object delete command issued by an administrator may be performed by database 135 deleting the object from the database. The delete command may not actually delete the object from database 135, but instead, may mark the most recent version of the object as having an EndSID field 440 value equal to the most recent snapshot. Subsequent snapshots will not include the deleted object in the snapshot. More particularly, in response to a delete object command, database 135 may initiate a new snapshot, retrieve the object specified by the delete command, increment ObjectID field 425 and VersionID field 430 of the object to the next version values, and set EndSID field 440 to be equal to the number of snapshots.

Database 135 may allow users to delete snapshot objects 325. In deleting a snapshot object 325, database 135 may delete all objects 315 that are contained within the snapshot. In one implementation, database 135 may perform the snapshot deletion by performing a query to obtain all objects 315 that are only in the snapshot that is to be deleted. Each of these objects may then be removed from database 135.

To retrieve a particular version of objects in database 135, database 135 may modify a received query by adding a constraint to the query in which StartSID field 435 is set to be less than or equal to the desired snapshot version number and EndSID field 440 is set to be greater than or equal to the desired snapshot version number. In the case of retrieving the most recent version of objects in database 135, StartSID field 435 may be set to be less than or equal to the preset maximum value (e.g., 0xFFFFFFFF) and EndSID field 440 may be set to be greater than or equal to the preset maximum value.

As previously mentioned, objects 315 in database 135 may include a referential relationship among one another, in which objects 315 may depend from one another. Database 315 may maintain the referential relationship between objects 315 as objects are modified, added, or deleted from database 315. As previously mentioned, referrerList field 455 may store, for each object 315, a list of other objects that depend on the object.

Internally, database 135 may keep track of the referential relationship between objects. Certain operations on database 135 may not be completed if the operation would compromise referential integrity. For instance, object deletion may fail if the deletion operation would cause dangling references. In one implementation, to keep track of references between objects, database 135 may store an object reference map. In another implementation, to keep track of references between objects, database 135 may maintain a "raw" table (i.e., key/value pair table) used to keep track of references between objects. In this implementation, the table keys may be based on both a referee identifier and a referrer identifier. Both the referee identifier and the referrer identifier may contain the object version identifier. When an object 315 is inserted into database 135, a new entry may be added to the table for each object to which the inserted object refers. When an object 315 is deleted from database 135, database may verify that the deleted object is not referred by another object. If it is, the delete operation may be rejected or the referred entries may also be deleted (cascaded delete).

As described above, versioning of a database, such as an XML database, may be performed using snapshot objects that represent a logical view of the database. Each snapshot object may include a relatively simple object made of a number of attributes. In addition, the stored application objects may be associated with metadata that may be used in conjunction with the snapshot objects to perform the versioning. The versioning described herein can, in some implementations, be implemented on top of traditional database logic.

CONCLUSION

The foregoing description provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 7, the order of the blocks may be modified in other implementations. Further, non-dependent blocks may be performed in parallel.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A method comprising:
   creating, by one or more computing devices, a snapshot object,
      the snapshot object representing a logical view of a plurality of application objects stored in a memory at a particular time,
      the plurality of application objects including a first application object, and
      the first application object being associated with state information including information identifying a version of the first application object and information identifying a range of snapshot objects that apply to the first application object;
   receiving, by the one or more computing devices, a first request to store a first modified version of the first application object in the memory;
   determining, by the one or more computing devices, whether a second modified version of the first application object has been stored in the memory after the snapshot object was created based on the state information associated with the first application object;
   selectively storing, by the one or more computing devices and in the memory, one of the first modified version of the first application object or a new application object based on whether the second modified version of the first application object has been stored in the memory after the snapshot object was created,
      the new application object being stored in the memory when the second modified version of the first application object has not been stored in the memory after the snapshot object was created,
         storing the new application object causing the memory to include the first application object and the new application object, and
         the new application object including:
            the first modified version of the first application object, and
            modified state information indicating that the first modified version of the first application object has been stored in the memory after the snapshot object was created, and
      the first modified version of the first application object being stored in the memory when the second modified version of the first application object has been stored in the memory after the snapshot object was created,
         storing the first modified version of the first application object replacing the second modified version of the first application object with the first modified version of the first application object in the memory;
   receiving, by the one or more computing devices, a query to return a group of application objects that are included in a specified snapshot;
   appending, by the one or more computing devices, search terms to the query to form a modified query; and
   retrieving, by the one or more computing devices and based on searching the state information of the plurality of application objects using the modified query, only application objects, of the plurality of application objects, included in the specified snapshot.

2. The method of claim 1, where the state information is stored in the memory as metadata associated with each application object, of the plurality of application objects; and
where selectively storing the one of the first modified version of the first application object or the new application object includes:
modifying the metadata associated with the first application object based on selectively storing the one of the first modified version of the first application object or the new application object.

3. The method of claim 1, where the memory includes an extensible markup language (XML) database and each application object, of the plurality of application objects, includes an XML document.

4. The method of claim 1, where the information identifying the range of snapshot objects that apply to the application object includes:
a first field that includes a first value that identifies a first snapshot object created after the first application object was stored in the memory, and
a second field that includes a second value that identifies a snapshot object to be created after creating the snapshot object; and
where determining whether the second version of the first application object has been stored in the memory after the snapshot object was created includes:
determining whether the second version of the first application object has been stored in the memory based on the first value and the second value.

5. The method of claim 1, where the snapshot object includes:
a field that includes information identifying the particular time; and
where determining whether the second version of the first application object has been stored in the memory after the snapshot object includes:
determining whether the second version of the first application object has been stored in the memory based on the information identifying the particular time included in the snapshot object.

6. The method of claim 1, further comprising:
determining an occurrence of a triggering event associated with the first application object,
where the triggering event includes one or more of:
an update to a device associated with the first application object, or
a modification to a security policy associated with the device; and
performing a snapshot operation to initiate creating the snapshot object, based on determining the occurrence of the triggering event.

7. The method of claim 1, where appending the search terms to the query includes:
adding a constraint to the query,
the constraint including:
a first value that is set to be less than or equal to a version number associated with the specified snapshot object, and
a second value that is set to be greater than or equal to the version number associated with the specified snapshot; and
searching, based on the first value and the second value, the information identifying the range of snapshot objects included in the state information of the plurality of application objects to return only the application objects included in the specified snapshot.

8. The method of claim 1, where the each application object, of the plurality of application objects, is associated with a corresponding network device, of a plurality of network devices, and specifies one or more configuration parameters of a security policy of the corresponding network device.

9. A device comprising:
a processor to:
store a plurality of application objects in a memory,
perform a snapshot operation to create a snapshot object,
the snapshot object representing a logical view of the plurality of application objects at a time the snapshot operation is performed;
associate each application object, of the plurality of application objects, with state information including information identifying at least a version of the application object and information identifying a range of snapshot objects that apply to the application object;
receive a request to store a first modified version of one of the plurality of application objects, in the memory;
determine whether a second modified version of the one of the plurality of application objects has been stored in the memory after the time the snapshot operation is performed;
selectively store one of the first modified version of one of the plurality of application objects or a new application object in the memory based on whether the second modified version of the one of the plurality of application objects has been stored in the memory after the time the snapshot operation is performed,
the new application object being stored in the memory when the second modified version of the one of the plurality of application objects has not been stored in the memory after the time the snapshot object is performed,
storing the new application object causing the memory to include the one of the plurality of application objects and the new application object, and
the new application object including:
the first modified version of the one of the plurality of application objects, and
modified state information indicating that the first modified version of the one of the plurality of application objects has been stored in the memory after the time the snapshot object is performed, and
the first modified version of the one of the plurality of application objects being stored in the memory when the second modified version of the one of the plurality of application objects has been stored in the memory after the snapshot object is performed,
storing the first modified version of the one of the plurality of application objects replacing the second modified version of the one of the plurality of application objects with the first modified version of the one of the plurality of application objects in the memory;
receive a query to return a group of application objects that are included in a specified snapshot operation;
append search terms to the query to form a modified query; and
retrieve, based on searching the state information of the plurality of application objects using the modified query, only application objects, of the plurality of application objects, included in the specified snapshot operation.

10. The device of claim 9, where the state information is stored in the memory as metadata of the plurality of application objects; and
where, when selectively storing the one of the first modified version of the one of the plurality of application objects or the new application object, the processor is further to:
modify the metadata to identify the at least one of the first modified version of the one of the plurality of application objects or the new application object as a current version of the one of the plurality of application objects.

11. The device of claim 9, where the plurality of application objects include XML documents.

12. The device of claim 9, where the information identifying the range of snapshot objects that apply to the application object includes:
a value that identifies a most recent snapshot object that applies to the application object; and
where determining whether the second modified version of the one of the plurality of application objects has been stored in the memory after the time the snapshot operation is performed includes:
determining whether the value identifies the snapshot object as the most recent snapshot object that applies to the one of the plurality of application objects, and
determining whether the second modified version of the one of the plurality of application objects has been stored in the memory after the time the snapshot operation is performed based on whether the value identifies the snapshot object as the most recent snapshot object.

13. The device of claim 9, where the snapshot object includes:
a timestamp attribute that includes information identifying the time that the snapshot operation is performed; and
where, when determining whether the second modified version of the one of the plurality of application objects is stored in the memory after the time the snapshot operation is performed, the processor is further to:
determine whether the second modified version of the one of the plurality of application objects has been stored in the memory after the time the snapshot operation is performed based on the information identifying the range of snapshot objects that apply to the one of the plurality of application objects and the information identifying the time that the snapshot operation is performed.

14. The device of claim 9, where the processor is further to:
perform the snapshot operation based on a triggering event associated with the one of the plurality of application objects,
where the triggering event includes one or more of:
an update to a network device associated with the one of the plurality of application objects, or
a modification to a security policy associated with the network device.

15. The device of claim 9, where, when appending the search terms to the query, the processor is to:
add a constraint to the query,
the constraint including:
a first value that is set to be less than or equal to a version number associated with the specified snapshot object, and
a second value that is set to be greater than or equal to the version number associated with the specified snapshot; and
search, based on the first value and the second value, the information identifying the range of snapshot objects included in the state information of the plurality of application objects to return only the application objects included in the specified snapshot operation.

16. The device of claim 9, where the device includes a device to manage network devices.

17. The device of claim 16, where the plurality of application objects include objects relating to network security policies or network device configurations.

18. A non-transitory computer-readable medium storing instructions, the instructions comprising:
one or more instructions which, when executed by one or more processors, cause the one or more processors to:
create a snapshot object,
the snapshot object representing a logical view of a plurality of application objects stored in a memory at a particular time,
the plurality of application objects including a first application object,
the first application object being associated with state information that includes information identifying a range of snapshot objects that apply to the first application object and information identifying a version of the first application object;
receive a first request to store a first modified version of the first application object in the memory;
determine whether the first application object has been modified since the particular time based on the state information associated with the first application object;
selectively store one of the first modified version of the first application object or a new application object in the memory based on whether the first application object has been modified since the particular time,
the new application object being stored in the memory when the first application object has not been modified since the particular time,
the new application object including:
the first modified version of the first application object, and
modified state information indicating that the first application object has been modified since the particular time, and
the first modified version of the first application object being stored in the memory when the first application object has been modified since the particular time,
storing the first modified version of the first application object in the memory causing a previously modified version of the first application object to be replaced, in the memory, by the first modified version of the first application object;
receive a query to return a group of application objects that are included in a specified snapshot operation;
append search terms to the query to form a modified query; and
retrieve, based on searching state information of the plurality of application objects using the modified query, only application objects, of the plurality of application objects, included in the specified snapshot operation.

19. The non-transitory computer-readable medium of claim 18, where the memory includes an extensible markup language (XML) database and the application objects include XML documents.

20. The non-transitory computer-readable medium of claim 18, where the snapshot object includes:
   a snapshot identification (ID) field that includes an identification value for the snapshot, and
   where the one or more instructions to determine whether the first application object has been modified since the particular time include:
      one or more instructions which, when executed by the one or more processors, cause the one or more processors to determine whether the first application object has been modified since the particular time based on the identification value.

21. The non-transitory computer-readable medium of claim 20, where the snapshot object further includes:
   a timestamp field that includes first information that identifies the time at which the snapshot operation was performed, and
   a type field that includes second information identifying types of application objects included in the snapshot object; and
   where the one or more instructions to determine whether the first application object has been modified since the particular time include:
      one or more instructions which, when executed by the one or more processors, cause the one or more processors to determine whether the first application object has been modified since the particular time based on the first information and the second information.

22. The non-transitory computer-readable medium of claim 20, where each of the plurality of application objects stored in the memory is additionally associated with a version identifier, and
   where the one or more instructions to determine whether the first application object has been modified since the particular time include:
      one or more instructions which, when executed by the one or more processors, cause the one or more processors to determine whether the first application object has been modified since the particular time based on the version identifier associated with the first application object.

* * * * *